United States Patent
Maehara et al.

[11] Patent Number: 5,359,425
[45] Date of Patent: Oct. 25, 1994

[54] IMAGE RECORDING APPARATUS FOR SELECTIVELY PERFORMING A PRINTER MODE AND A SCANNER MODE

[75] Inventors: Hidejirou Maehara, Yokohama; Yasuyuki Nukaya, Tokyo, both of Japan

[73] Assignee: Ricoh Company, Ltd., Tokyo, Japan

[21] Appl. No.: 950,839

[22] Filed: Sep. 24, 1992

[30] Foreign Application Priority Data

Sep. 30, 1991 [JP] Japan .................................. 3-252256
Nov. 21, 1991 [JP] Japan .................................. 3-306216
Aug. 17, 1992 [JP] Japan .................................. 4-217980

[51] Int. Cl.$^5$ .............................................. H04N 1/21
[52] U.S. Cl. ..................................... 358/300; 346/160
[58] Field of Search ............... 358/296, 300, 302, 496, 358/498; 346/108, 160, 107 R

[56] References Cited

U.S. PATENT DOCUMENTS 5,038,228  8/1991  Takada .................................. 358/498
5,095,370  3/1992  Takada et al. ........................ 358/300

Primary Examiner—Mark J. Reinhart
Attorney, Agent, or Firm—Cooper & Dunham

[57] ABSTRACT

An image recording apparatus for selectively performing a document reading mode and an image printing mode, which includes a scanner unit for reading an image from a document sheet, an image forming part for forming a latent image on a photosensitive medium with a light beam, a transfer part for transferring the latent image of the photosensitive medium to a copy sheet as a visible image, a fixing part for producing an image recorded on the copy sheet by fixing the visible image to the copy sheet, a first transporting part for transporting a sheet to a registration roller through a common sheet transport path, the common sheet transport path usable for transporting either a document sheet passed through the scanner unit or a copy sheet fed by a paper feeding cassette, and a second transporting part for transporting a sheet from the registration roller to a paper ejection part through a second sheet transport path. In this image recording apparatus, the image forming part, the transfer part and the fixing part are not driven when a document sheet is transported through the second sheet transport path during the document reading operation.

10 Claims, 7 Drawing Sheets

IMAGE RECORDING APPARATUS FOR SELECTIVELY PERFORMING A PRINTER MODE AND A SCANNER MODE

BACKGROUND OF THE INVENTION

The present invention generally relates to an image recording apparatus with a scanner unit, and more particularly to an image recording apparatus with a scanner unit which selectively performs a printer mode in which an image is printed on a copy sheet, and a scanner mode in which an image is read from a document. This apparatus is applicable to laser printers, copying machines, facsimile machines and others.

Conventionally, a printing apparatus with a scanner unit can perform a scanner mode and a printer mode. When the scanner mode is performed by this printing apparatus, an original document is passed through a scanner unit and an image is read from the document by illuminating the document with light emitted by a light source of the scanner unit so that a signal indicating the original image is produced from the light reflected from the document.

In the meantime, when the printer mode is performed by the printing apparatus mentioned above, a copy sheet is fed from a paper cassette in the printing apparatus, and the copy sheet is transported to a photosensitive drum via a pair of registration rollers. The photosensitive drum is electrostatically charged by a charging unit, and the surface of the photosensitive drum is exposed to light emitted by a light source of an optical recorder unit, so that an electrostatic latent image in accordance with an image signal is formed on the photosensitive drum. By means of the pair of registration rollers, the time of forming the electrostatic latent image on the photosensitive drum is harmonized with the time of transporting the copy sheet to the photosensitive drum.

FIG. 1 shows the construction of the optical recorder unit provided within the above mentioned printing apparatus. As described above, at this optical recorder unit, an electrostatic latent image is formed on a photosensitive medium. A light beam emitted by a laser diode 1 of the optical recorder unit in accordance with an image signal modulated by a driver 7 is passed through a collimator lens 2 and a cylindrical lens 3, and it is deflected by a polygonal mirror 4 which is rotated by a driving motor (not shown) around a rotating axis of the polygonal mirror 4. The deflected light beam is passed through a focusing lens 5 and a troidal lens 6 to convert the light beam into a converging light beam. This converging light beam is cast on a photosensitive drum 8 to form a beam spot on the photosensitive drum 8. Because the polygonal mirror 4 is rotated by the driving motor around the rotating axis of the polygonal mirror 4, the photosensitive drum 8 is scanned by the converging light beam from the polygonal mirror 4 in a main scanning direction indicated by an arrow A in FIG. 1. The photosensitive drum 8 is also rotated around its rotating axis, and it is scanned by the converging light beam in a sub scanning direction perpendicular to the main scanning direction. Thus, an electrostatic latent image is formed on the photosensitive drum 8 by the optical recorder unit in accordance with the image signal.

In the printing apparatus described above, a developing unit including a toner cartridge is provided. When the electrostatic latent image on the photosensitive drum is passed through the developing unit, the electrostatic latent image is developed on the photosensitive drum with toner, so that the electrostatic latent image is made visible. This toner image is transferred by a transfer charging unit from the photosensitive drum to a copy sheet. This copy sheet has been transported to the photosensitive drum 8 via the registration rollers in a synchronized manner. Then, the copy sheet with the toner image is transported from the photosensitive drum to a fixing unit including a fixing heater, so that the toner image is fixed to the copy sheet by the heat and pressure of the fixing unit. The copy sheet is then transported from the fixing unit to a copy sheet ejection outlet part of the printing apparatus. Each copy sheet transported from the fixing unit is stacked at the copy sheet ejection outlet part.

However, in the above described printing apparatus, during the scanner mode operation in which the scanner unit is operated, some print processing units including the optical recorder unit, the fixing unit and the transfer charging unit, which should be used in the printer mode only, are unnecessarily driven. Thus, in the above described printing apparatus, there is a problem in that the driving of such printing processing units for a long period of time during the scanner mode operation will shorten an operational life of each of the units in the printing apparatus, and also the electric energy consumed by the printing apparatus is higher than a reasonable energy consumption level. Also, the construction of the conventional printing apparatus is bulky because both the driving mechanism of the built-in scanner and the driving mechanism of the print processing units are necessary.

Moreover, at the time of an original document sheet being passed through the transfer charging unit or the fixing unit when the scanner mode is performed in the printing apparatus described above, there is a problem in that an original document to be scanned may be damaged due to the pressure of the transfer charging unit or the heat and pressure of the fixing unit, and that a residual toner on the photosensitive medium is transferred to the original document sheet.

SUMMARY OF THE INVENTION

Accordingly, it is a general object of the present invention to provide an improved image recording apparatus in which the above described problems are eliminated.

Another, more specific object of the present invention is to provide an image recording apparatus with scanner unit which apparatus is compact and capable of performing both the printer mode and the scanner mode by driving only the minimum number of component units necessary for performing either of the two modes. The above mentioned object of the present invention is achieved by an image recording apparatus for selectively performing a document reading mode in which an image is read from a document sheet, and an image printing mode in which an image is printed on a copy sheet, which apparatus includes a scanner unit for reading an image from a document sheet passed through the scanner unit, an image forming part for generating a light beam in accordance with an image signal and for forming an electrostatic latent image on a photosensitive medium by using the generated light beam, a transfer part for transferring the electrostatic latent image formed on the photosensitive medium of the image forming part to a copy sheet, a fixing part for producing a visible image recorded on the copy sheet by fixing the image transferred by the transfer part to the copy sheet using a pressure roller and a fixing roller with a fixing heater, a first transporting part for transporting a sheet to a registration roller through a common sheet transport path, the common sheet transport path being usable to either transport a document sheet from the scanner unit to the registration roller or transport a copy sheet from a paper feeding cassette to the registration roller, a second transporting part for transporting a sheet passed through the registration roller to a paper ejection part through a second sheet transport path, the second sheet transport path extending from the registration roller to the paper ejection part via the image forming part, the transfer part and the fixing part, wherein the image forming part, the transfer part and the fixing part are not driven when a document sheet is transported through the second sheet transport path by the second transporting part during the document reading mode.

Still another object of the present invention is to provide an image recording apparatus including a scanner for reading an image from a document, and an image forming part for recording an image on a copy sheet, which safely prevents the document from being damaged due to heat and pressure of the image forming part when the document is passed through the image forming part during the scanner mode operation.

According to the present invention, when the scanner mode is operated, the scanner unit and the sheet transporting part are driven, but the optical recorder unit, the transfer charging unit and the fixing unit are not driven, thus preventing the print processing units from suffering undesired deterioration and wear through a long period of use of the omage recording apparatus. Thus, it is possible to increase the operational life of each of the print processing units in the image recording apparatus. Also, a common sheet feeding inlet is used as the copy sheet inlet and the document sheet inlet, and a common sheet transport path is used as the image reading mode path of the document sheet and the print processing mode path of the copy sheet, thus the image recording apparatus is compact. Moreover, according to the present invention, it is possible to prevent the document sheet from being damaged due to the heat and pressure when the document sheet is passed through the transfer charging unit or the fixing unit in the scanner mode.

Other objects and further features of the present invention will become apparent from the following detailed description when read in conjunction with the accompanying drawings.

DESCRIPTION OF THE PREFERRED EMBODIMENTS

A description will now be given of a first embodiment of an image recording apparatus according to the present invention, with reference to FIG. 2. In the apparatus shown in FIG. 2, the scanner mode and the printer mode are selectively performed in the manner as described above in conjunction with the conventional printing system described above.

Figure 1:
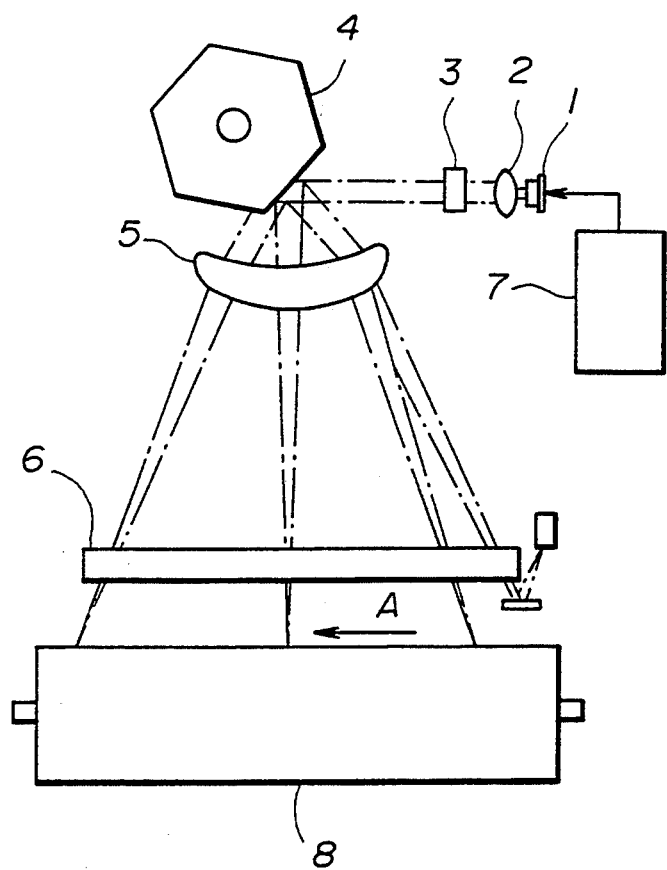
FIG. 1 is a view showing an optical recorder unit of a conventional image recording apparatus.
Figure 2:
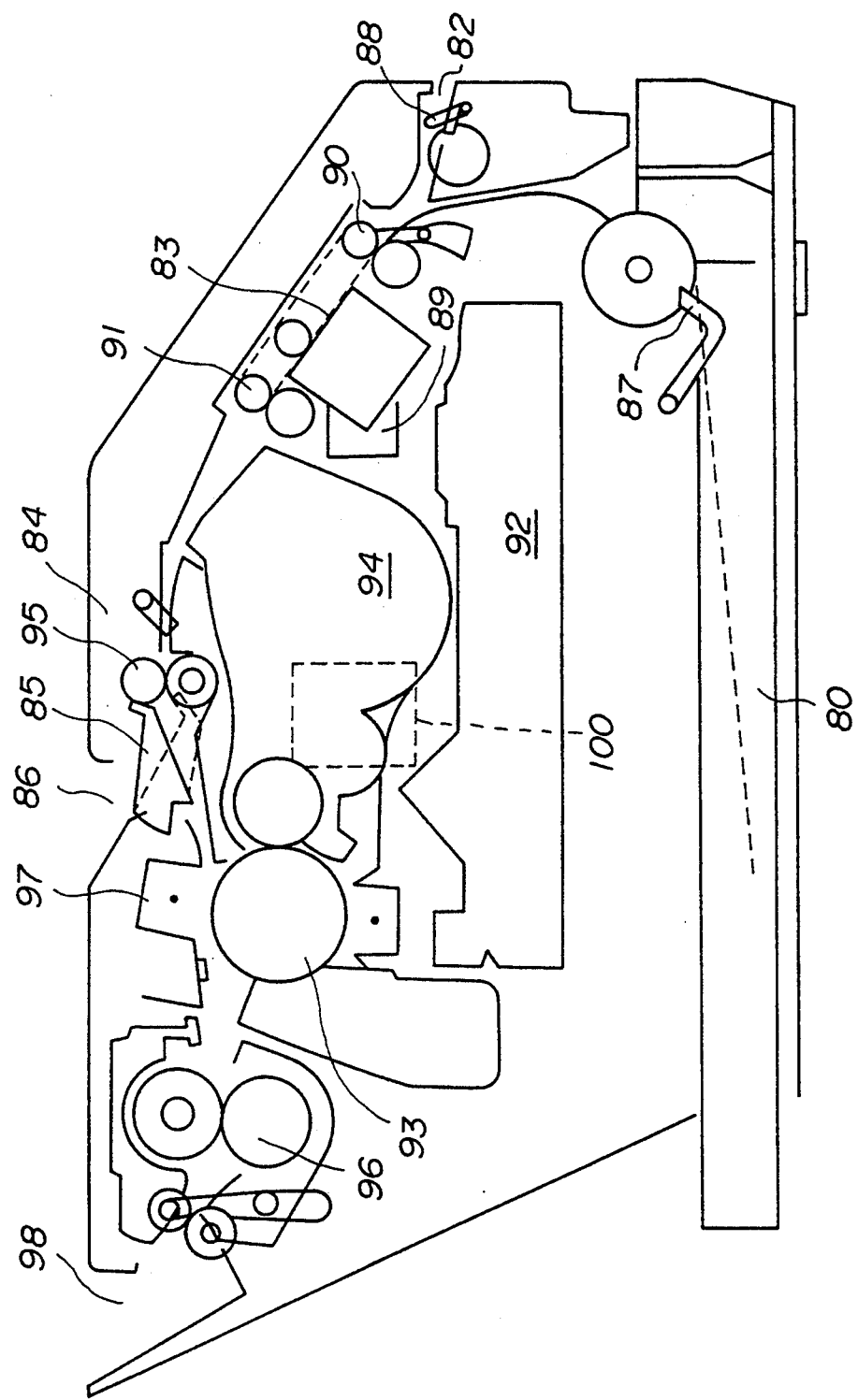
FIG. 2 is a view showing a first embodiment of an image recording apparatus according to the present invention.

In the image recording apparatus shown in FIG. 2, when the scanner mode is started, a stepper motor 89 is switched ON, and a paper feeder clutch 87 (with a paper feeding roller), a manual feeder clutch 88 (with a manual feeder sensor), a pair of transport rollers 90, 91, and a registration roller 95 (with a registration clutch) are driven so as to transport an original document sheet in a common transport path of the image recording apparatus. The common transport path extends from the paper feeding roller (or the manual feeding roller) to the registration roller 95 via the transport rollers 90 and 91 in the image recording apparatus. The original document sheet is automatically fed from a paper cassette 80 or manually sent via a manual feeder inlet 82, and it is passed through a scanner unit 83 in the common transport path, and sent to a registration part 84 including the registration roller 95 and the registration clutch.

When the scanner mode of the image recording apparatus is performed, a selector clutch 85 is placed at a first, off-state position which position is indicated by a dotted line of the selector clutch 85 in FIG. 2. After an image is read by the scanner unit 83 from the original document, the original document sheet is passed through the registration roller 95 and guided by the selector clutch 85 so that the original document sheet is ejected to an original sheet ejection outlet 86. During the procedure described above, a main motor 100 of the image recording apparatus is switched off. The driving motor and the laser diode, included in an optical recorder unit 92, are also not driven. A photosensitive drum 93, a developing unit 94 and a fixing unit 96, included in the print processing units of the image recording apparatus, are not driven in the scanner mode.

In the meantime, when the printer mode of the image recording apparatus is commenced to print an image on a copy sheet, the stepper motor 89 is switched ON, and the paper feeder clutch 87 (with the paper feeding roller), the manual feeder clutch 88 (with the manual feeder sensor), the transport rollers 90, 91 and the registration roller 95 (with the registration clutch) are driven so as to transport a copy sheet in the common transport path from the paper feeding roller (or the manual feeding roller) to the registration roller 95. In the image recording apparatus of the present invention, the common transport path is used both in the printer mode and in the scanner mode. A copy sheet to be printed is automatically fed from the paper cassette 80 or manually sent via the manual feeder inlet 82 so that the copy sheet is passed in the common transport path through the scanner unit 83, and it is sent to the registration part 84.

During the above mentioned procedure, the scanner unit 83 is switched off and not driven. The selector clutch 85, when the printer mode is commenced, is placed at a second, on-state position as indicated by a solid line of the selector clutch 85 in FIG. 2. The copy sheet passing through the registration roller 95 is guided by the selector clutch 85, and it is sent to the fixing unit 96 via a transfer charging unit 97 and the photosensitive drum 93. After a toner image is fixed to the copy sheet at the fixing unit 96, the copy sheet is ejected to a copy sheet ejection outlet 98.

Figure 3:
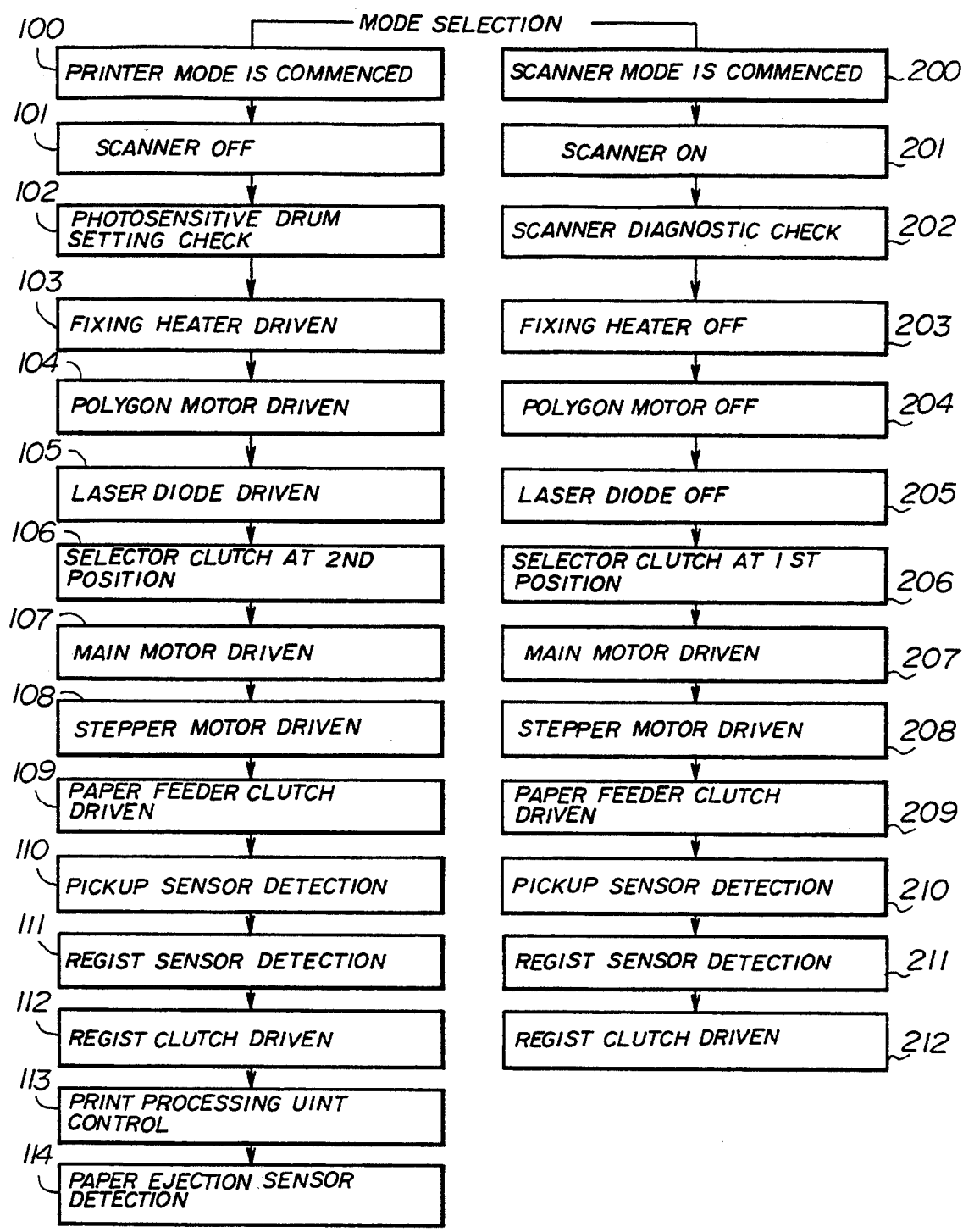
FIG. 3 is a diagram for explaining a set of processes performed by the image recording apparatus shown in FIG. 2 after either a printer mode or a scanner mode is commenced.

FIG. 3 shows operations performed by the image recording apparatus shown in FIG. 2 when either the printer mode or the scanner mode is commenced. As shown in FIG. 3, when the printer mode is commenced in step 100, the image recording apparatus performs the image printing procedures related to the print processing units. More specifically, in step 101 of the flow chart shown in FIG. 3, the scanner unit 83 is switched OFF. The photosensitive drum 93 is checked for the setting thereof in step 102, the fixing unit 96 is switched ON and driven for the image fixing process in step 103, the driving motor of the optical recorder unit 92 is switched ON and driven to rotate the polygonal mirror in step 104, and the laser diode of the optical recorder unit 92 is switched ON and driven to emit a light beam in step 105. In step 106, the selector clutch 85 is placed at the second on-state position so as to send a copy sheet from the registration roller 95 to the fixing unit 96 via the selector clutch 85.

In step 107, the main motor 100 of the image recording apparatus is switched on and off to drive the print processing units related to the printer mode. In steps 108 through 112, the stepper motor, the paper feeder clutch, a pickup sensor, the registration sensor and the registration clutch are respectively driven. In step 113, the print processing units are driven to control the image recording processes such as electrostatic charging, developing, image transferring, charge removing, and image fixing. In step 114, a paper ejection sensor detects whether or not a copy sheet is ejected to the copy sheet ejection outlet after the toner image is fixed to the copy sheet.

In the flow chart shown in FIG. 3, when the scanner mode is commenced in step 200, the image recording apparatus performs the document reading procedures related to the scanner unit. More specifically, the scanner unit 83 is switched on in step 201. In step 202, the scanner unit 83 is subjected to a diagnostic check for any malfunction of the scanner unit. In steps 203 through 205, the fixing heater of the fixing unit 96, the driving motor of the optical recorder unit 92, and the laser diode thereof are switched off. Thus, these units are not driven during the scanner mode operation. When the scanner mode is commenced, the selector clutch 85 is placed at the first, off-state position to send the original document sheet from the registration roller 95 to the original sheet ejection outlet 86. In steps 207 through 212, the same procedures as the corresponding procedures of the above steps 107 through 112 are performed, and a description thereof will be omitted.

When the scanner unit is operated during the scanner mode, the main motor is switched off and the print processing units are not operated. Thus, if the photosensitive drum malfunctions, the document reading procedure can safely be performed. Also, if the fixing heater, the laser diode or the driving motor malfunctions, the document reading procedure can safely be performed. In the meantime, when the print processing units are operated during the printer mode, the scanner unit is switched off. Thus, if the scanner unit malfunctions, the print processing procedures can safely be performed.

Figure 4:
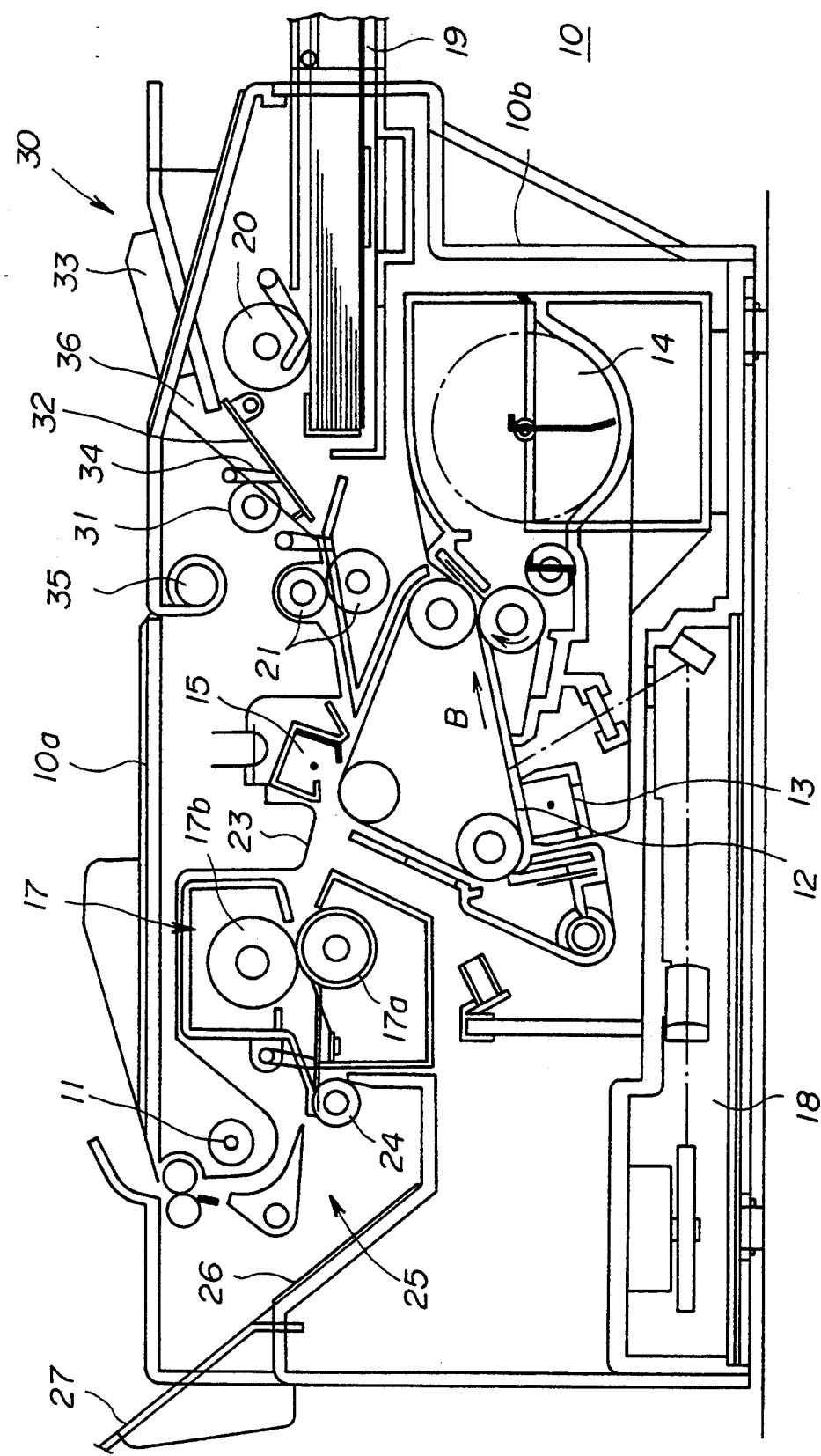
FIG. 4 is a view showing a laser printer with no built-in scanner unit to which the present invention is applied.

Next, a description will be given of a second embodiment of the present invention, with reference to FIGS. 4 and 5. FIG. 4 shows a laser printer system with no built-in scanner unit, to which the present invention is applied. This system generally has an upper component unit 10a and a lower component unit 10b. The upper component unit 10a is rotatably supported on a hinge member 11 of the lower component unit 10b, so that the upper component unit 10a can be opened to the exterior, and closed back to the lower component unit 10b at the closed position.

In the printing apparatus 10 shown in FIG. 4, an image forming unit having a belt-type photosensitive medium 12 is provided in the midst of the lower component unit 10b. When the printer mode is performed, this photosensitive medium 12 is rotated on a set of driving rollers counterclockwise in a direction indicated by an arrow B in FIG. 4. The laser printer also includes a charging unit 13, a developing unit 14, a transfer charging unit 15, and a cleaning unit 16 provided respectively at intermediate portions around the belt-like photosensitive medium 12. The above mentioned units 12 through 16 are called electrophotographic processing units. An optical recorder unit 18 is provided at a bottom portion of the lower component unit 10b which portion is located under the electrophotographic processing units.

At the upper, right-hand portion of the laser printer shown in FIG. 4, a paper cassette 19 is detachably mounted to the lower component unit 10b. A copy sheet is automatically fed from the paper cassette 19 by a paper feeding roller 20, and it is sent to a pair of registration rollers 21. By means of the registration rollers 21, the copy sheet is transported to an upper portion of the photosensitive medium 12 at a harmonized timing. The transporting of the copy sheet performed by the registration roller 21 is harmonized with the image forming on the photosensitive medium 12 performed by the optical recorder unit 18.

When the photosensitive medium 12 is rotated counterclockwise as in the direction indicated by the arrow B, the surface of the medium 12 is electrostatically charged by the charging unit 13 in a uniform manner. The photosensitive medium 12 is exposed to a laser beam emitted by the optical recorder unit 18, so that an electrostatic latent image is formed on the photosensitive medium 12. As the electrostatic latent image on the photosensitive medium 12 passes through the developing unit 14, the image is made visible with toner by the developing unit 14. This toner image is transferred from the photosensitive medium 12 to the copy sheet by the transfer charging unit 15. As described above, this copy sheet is transported to the upper portion of the medium 12 in a harmonized manner.

The copy sheet to which the toner image is transferred is guided by a transport guide 23, and it is sent to the fixing unit 17. The fixing unit 17 includes a fixing roller 17a and a pressure roller 17b. At the fixing unit 17, the copy sheet is placed between the fixing roller 17a and the pressure roller 17b under pressure, so that the toner image is fixed to the copy sheet. By means of a paper ejecting roller 24, the copy sheet is sent from the fixing unit 17 to a paper ejecting part 25. At the paper ejecting part 25, the copy sheet is guided by a guide plate 26 and it is stacked at a paper ejection tray 27.

Above the paper cassette 19 in the laser printer shown in FIG. 4, a manual paper feeder unit 30 is detachably mounted to the upper component unit 10a of the laser printer by using a positioning pin 35. This manual paper feeder unit 30 includes a feeding roller 31, a pressure plate 32, a pair of guide plates 33, and a paper feeder sensor 34. When a copy sheet is manually set to the manual paper feeder unit 30, a leading edge of the copy sheet appearing at a manual paper inlet part 36 is detected by the paper feeder sensor 34. The pressure plate 32 is then moved to come in contact with the feeding roller 31, and the feeding roller 31 is rotated to feed the copy sheet to the registration rollers 21 at the upper portion of the photosensitive medium 12. The image recording procedure for the manually set copy sheet is performed in the manner as described above regarding the automatically fed copy sheet, and an image is also recorded on the manually set copy sheet in accordance with an image signal.

Figure 5:
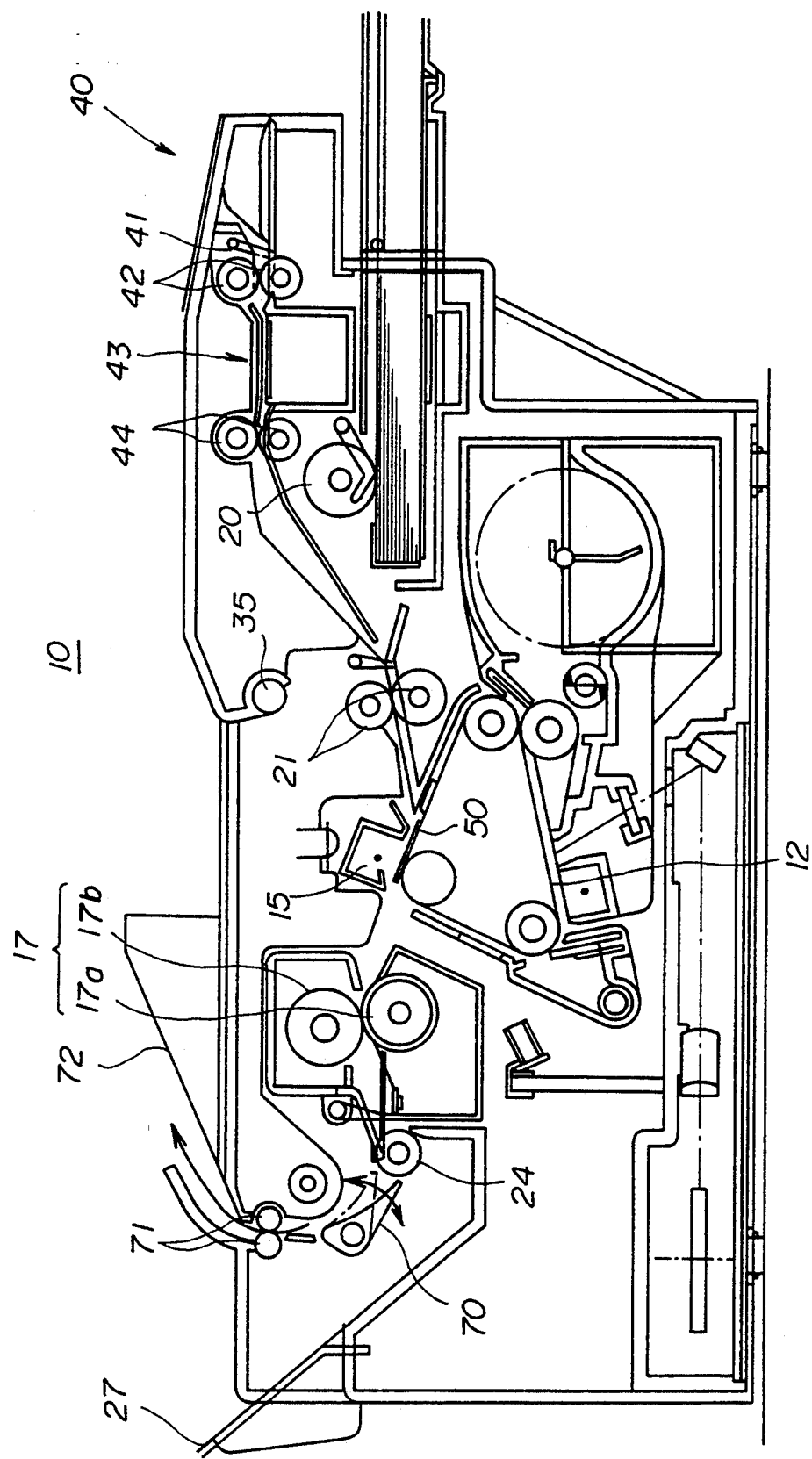
FIG. 5 is a view showing a second embodiment of an image recording apparatus according to the present invention, in which a scanner unit is built in the laser printer shown in FIG. 4.

FIG. 5 shows the construction of a second embodiment of the present invention. In the image recording apparatus shown in FIG. 5, the manual paper feeder unit 30 is removed, and a scanner unit 40 is mounted, in place of the unit 30, to the upper component unit 10a of the laser printer 10 by using the positioning pin 35. The scanner unit 50 which is built in the image recording apparatus shown in FIG. 5 is a reflection type image sensor unit, and it includes a document detecting sensor 41, a pair of first transport rollers 42, an image reading part 43, and a pair of second transport rollers 43.

The image recording apparatus shown in FIG. 5 is normally set to the printer mode in which an image is recorded on a copy sheet. However, if an original document sheet is manually set to the scanner unit 40 and the sheet is detected by the document detecting sensor 41, the image recording apparatus is set to the scanner mode in which an image is read from the original document. Otherwise, a modification of the above described embodiment may be made, wherein an appropriate switching mechanism is provided in the image recording apparatus so that the switching mechanism instructs the image recording apparatus to select either the printer mode or the scanner mode.

After the scanner mode of the image recording apparatus is commenced, the first and second transport rollers 42 and 44 are rotated to transport the original document sheet so that it is passed through the image reading part 43. At the image reading part 43, an image is read from the original document by illuminating it with light emitted by a light source of the scanner unit 40 and using the light reflected back from the document. The original document sheet, after the image is read therefrom, is sent to the registration rollers 21 of the image recording apparatus.

The sheet transporting procedure is performed in the manner as described above regarding the automatically fed copy sheet. By driving the sheet transporting units of the image recording apparatus, the original document sheet is transported from the registration rollers 21 to the paper ejecting roller 24 via the transfer charging unit 15 and the fixing unit 17. The original document sheet is then ejected to the paper ejection tray 27 by means of the paper ejecting roller 24.

Therefore, the image recording apparatus shown in FIG. 5 uses the copy sheet transport path between the registration rollers 21 and the paper ejecting roller 24 for transporting an original document sheet, which is scanned by the scanner unit 40 to read an image therefrom, to the paper ejection tary 27. Thus, the image recording apparatus of the present invention does not require a special paper ejection mechanism when the scanner unit is attached, and the image recording apparatus of the present invention is compact and the manufacturing cost is relatively low.

In the image recording apparatus described above, both a document sheet and a copy sheet passing through the fixing unit 17 are sent to the paper ejecting roller 24, and they are guided by the guide plate 26 and ejected to the paper ejection tray 27 by the paper ejecting roller 24. However, in the case of the above described apparatus, a number of document sheets and a number of copy sheets may coexist in a congested manner on the paper ejection tray 27. In order to eliminate this problem, a selector lever 70 is provided in the image recording apparatus of the present invention at a position downstream of the paper ejecting roller 24, as shown in FIG. 5. This selector lever 70 is selectively positioned between a first position (indicated by a solid line of the member 70 in FIG. 5) and a second position (indicated by a dotted line of the member 70 in FIG. 5). When the scanner mode is commenced, the selector lever 70 is positioned at the first position indicated by the solid line, so that each document sheet passing through the fixing unit 17 is guided by the selector lever 70 to a pair of second ejection rollers 71. The document sheet is then transported to a document stacking part 72 by means of the second ejection rollers 71. In the meantime, when the printer mode is commenced, the selector lever 70 is positioned at the second position indicated by the dotted line so that each copy sheet passing through the fixing unit is sent to the paper ejection tray 27 via the guide plate 26.

In the case of the image recording apparatus shown in FIG. 5, the original document sheet may be subjected to the pressure of the transfer charging unit when the original document sheet is passed through the transfer charging unit 15. In order to eliminate the above mentioned problem, the sheet transporting units are driven but the transfer charging unit is switched off when the scanner mode is commenced by a control unit in the image recording apparatus of the present invention. Thus, since the transfer charging unit is not driven during the scanner mode, the damaging of the document sheet due to the pressure of the transfer charging unit can safely be prevented.

Moreover, at the time of the original document sheet being passed through the transfer charging unit 15 during the scanner mode operation, a residual toner on the photosensitive medium 12 may be transferred to the original document sheet. In order to safely prevent the undesired residual toner on the photosensitive medium from being transferred to the original document sheet, the image recording apparatus of the present invention is provided with a shutter 50 for covering a document sheet from the photosensitive medium when the sheet is passed through the transfer charging unit.

Figure 6:
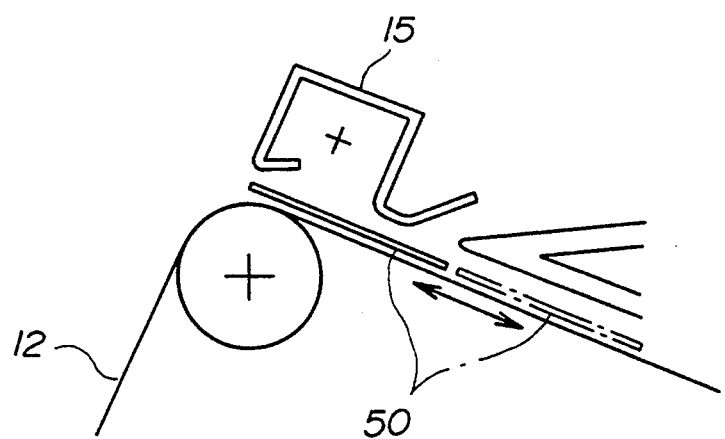
FIG. 6 is a view showing a shutter member provided in the image recording apparatus shown in FIG. 5.

FIG. 6 shows the shutter provided in the image recording apparatus between the transfer charging unit 15 and the photosensitive medium 12. As shown in FIG. 6, the shutter 50 is a rectangular covering plate which is moved between a first position and a second position: the first position located at the internal portion between the transfer charging unit 15 and the photosensitive medium 12, and the second position located apart from the transfer charging unit 15.

Figure 7:
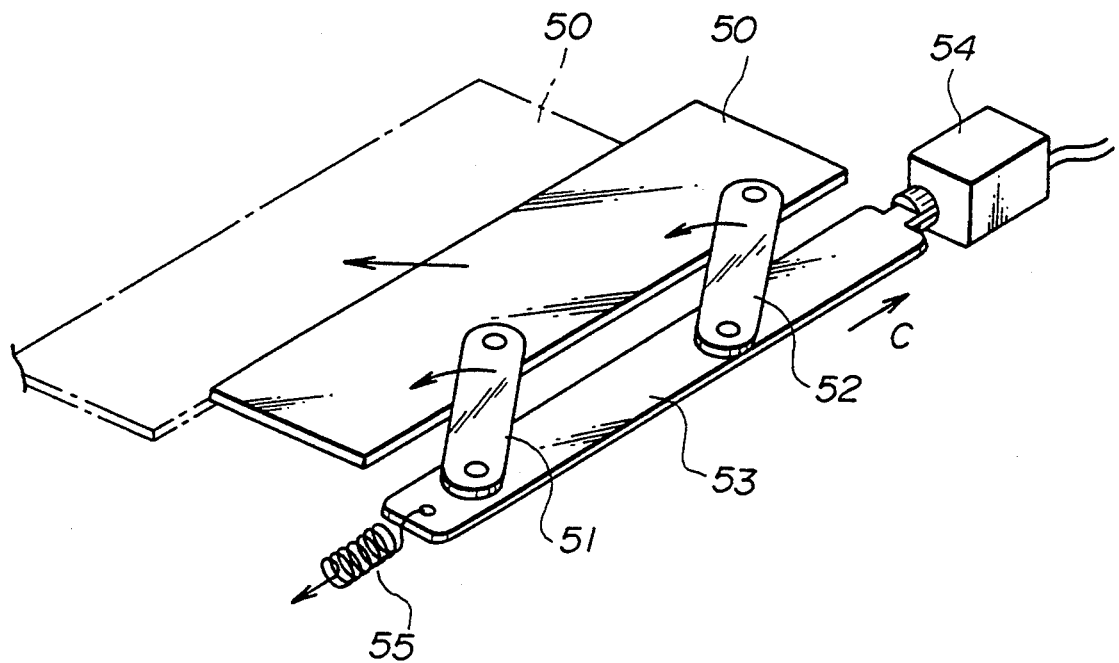
FIG. 7 is a perspective view showing the construction of the shutter member shown in FIG. 6.

FIG. 7 shows the construction of the shutter in the apparatus shown in FIG. 6. As shown in FIG. 7, the shutter 50 is pivotably supported by two sub links 51 and 52 at one end of each of the links 51 and 52. The shutter 50 is always biased by a spring (not shown in FIG. 7) toward the first position. The two sub links 51 and 52 are pivotably connected at the other ends of the links 51 and 52 to a main link 53. This main link 53 is connected at one end thereof to a solenoid unit 54, and connected at the other end thereof to a spring 55. The solenoid unit 54 including a coil and a movable core is coupled to a control unit in the image recording apparatus.

When the presence of a document sheet in the scanner unit 40 is detected by the document detecting sensor 41, a detection signal output by the sensor 41 is supplied to the control unit. The control unit then actuates the core of the solenoid unit 54 to draw the main link 53 in a direction indicated by an arrow C in FIG. 7 against a biasing force of the spring 55, and the shutter 50 is moved via the sub links 51 and 52 from its second position (indicated by a solid line of the member 50 in FIG. 7) to its first position (indicated by a dotted chain line of the member 50 in FIG. 7).

As the shutter 50 is placed at the first position between the photosensitive medium 12 and the transfer charging unit 15, the original document sheet is passed above the shutter 50 at the first position mentioned above, so that the original document sheet does not come in contact with the photosensitive medium 12.

Moreover, at the time of the original document sheet being passed through the fixing unit 17 in the scanner mode, the document sheet may be damaged due to the heat and pressure of the fixing unit 17. In the image recording apparatus of the present invention, means for safely preventing the document sheet from suffering the heat and pressure of the fixing unit during the scanner mode operation is provided. A fixing temperature value of the fixing heater of the fixing roller 17a is selected from a preset high temperature value required for the toner image fixing in the printer mode and a preset low temperature value usable in the scanner mode. In addition, a pressure switching member is provided on the fixing unit 17 in the image recording apparatus of the invention, the pressure switching member adjusting the pressure of the pressure roller 17b to a pressure level appropriate for the commenced mode.

Figure 8:
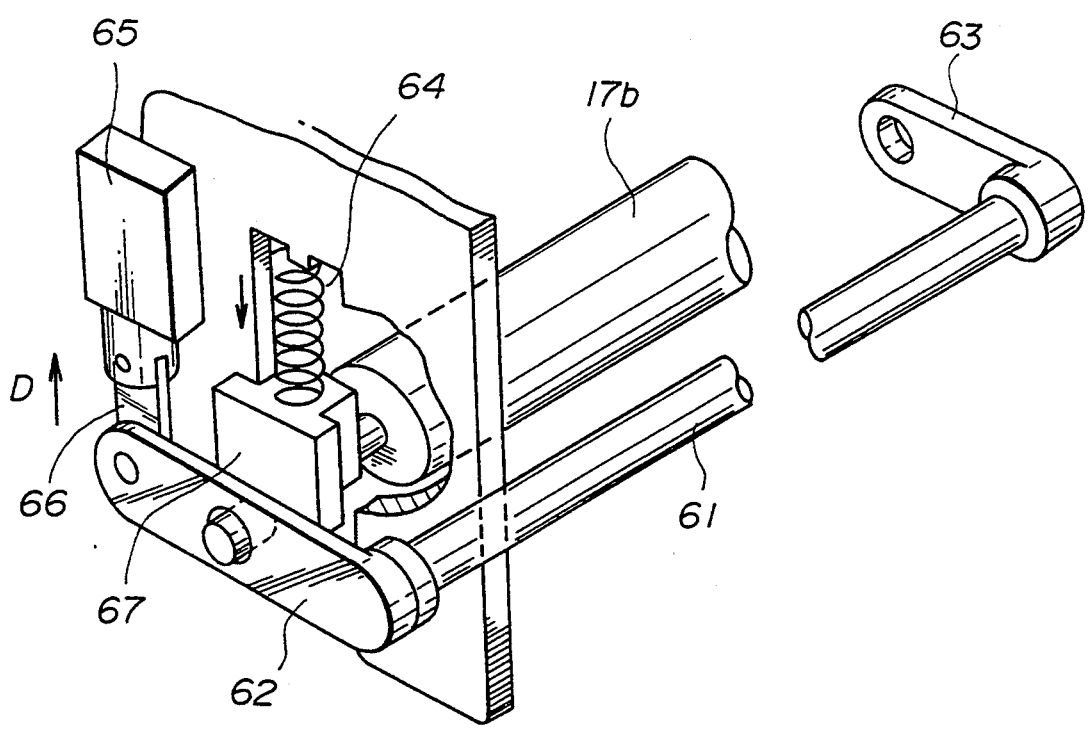
FIG. 8 is a perspective view showing a pressure switching member provided on the fixing unit in the image recording apparatus shown in FIG. 5.

FIG. 8 shows the construction of the fixing unit in which a pressure switching member is provided according to the image recording apparatus of the present invention. In the fixing unit shown in FIG. 8, two rotatable links 62 and 63 are respectively secured to a shaft 61 at one end portion of each of the links 61 and 62. The rotatable links 62 and 63 are rotatable around the shaft 61. A rotating shaft of the pressure roller 17b of the fixing unit 17 is rotatably supported on an opening portion of each of the two links 61 and 62 and on a bearing 67. The bearing 67 is normally pressed in a downward direction due to a biasing force of a spring 64 connected to a fixing unit frame, so that the fixing roller 15a (not shown in FIG. 8) at a lower part of the fixing unit 17 is pressed by the pressure roller 17b at an upper part thereof. The other end of the rotatable link 62 is pivotably connected to a lever 66 at its one end, and the other end of the lever 66 is also pivotably connected to a movable core of a solenoid unit 65. The solenoid unit 65 including a coil and the movable core is coupled to the control unit of the image recording apparatus.

When the presence of a document sheet in the scanner unit 40 is detected by the document detecting sensor 41, a detection signal output by the sensor 41 is received by the control unit, thereby actuating the core of the solenoid unit 65. As the core of the solenoid unit 65 is actuated to draw the lever 66 in a direction indicated by an arrow D in FIG. 8, opposite to a direction of the biasing force of the spring 64, the link 62 is rotated around the shaft 61 by the lever 66 so that the bearing 67 of the pressure roller 17b is raised upward against the downward biasing force of the spring 64.

Accordingly, when the scanner mode is selected, the upper portion of the photosensitive medium is covered with the shutter 50 described above, the pressure of the fixing roller 17b is suitably attenuated by the pressure switching member described above, and the fixing temperature level of the fixing roller 17a is lowered by the control unit. Hence, the sticking of the residual toner to the document sheet, the damaging of the document sheet due to the pressure of the transfer charging unit or the heat and pressure of the fixing unit can safely be prevented according to the present invention.

Further, the present invention is not limited to the above described embodiments, and variations and modifications may be made without departing from the scope of the present invention.

What is claimed is:

1. An image recording apparatus which selectively performs a document reading mode in which an image is read from a document sheet and an image printing mode in which an image is printed on a copy sheet, said image recording apparatus comprising:

a scanner unit, built in the image recording apparatus, for reading an image from a document sheet;

image forming means for generating a light beam in accordance with an image signal, and for forming an electrostatic latent image on a photosensitive medium by using the generated light beam;

transfer means for transferring the electrostatic latent image, formed on said photosensitive medium of said image forming means, to a copy sheet as a visible image;

fixing means for producing an image recorded on the copy sheet by fixing the visible image, transferred by said transfer means, to the copy sheet using a pressure roller and a fixing roller with a fixing heater;

first transporting means for transporting a sheet to a registration roller through a common sheet transport path, said common sheet transport path being usable to either transport a document sheet from the scanner unit to the registration roller or transport a copy sheet from a paper feeding cassette to the registration roller;

second transporting means for transporting a sheet passed through the registration roller to a paper ejection part through a second sheet transport path, the second sheet transport path extending from the registration roller to the paper ejection part via the image forming means, the transfer means and the fixing means, wherein said image forming means, said transfer means and said fixing means are not driven when a document sheet is transported through the second sheet transport path by said second transporting means during the document reading mode.

2. An image recording apparatus according to claim 1, wherein the image printing mode is commenced when a copy sheet fed from the paper feeding cassette is detected by a copy sheet detecting sensor, and the document reading mode is commenced when a document sheet placed into the scanner unit is detected by a document sheet detecting sensor.

3. An image recording apparatus according to claim 1, wherein a fixing temperature of the fixing heater of the fixing means is preset to a low temperature value when the document reading mode is commenced, and when the image printing mode is commenced said fixing temperature is preset to a high temperature value.

4. An image recording apparatus according to claim 1, wherein a pressure applied by the pressure roller of the fixing means to the fixing roller thereof is lowered when the document reading mode is commenced, and when the image printing mode is commenced said pressure of said pressure roller is adjusted back to an original pressure of the pressure roller.

5. An image recording apparatus according to claim 1, further comprising a selector lever for guiding a sheet passed through the registration roller to the paper ejection part, said selector lever being placed at a first position when the document reading mode is commenced, so that a document sheet is sent to a document ejection outlet part provided at a portion of the image recording apparatus separate from the paper ejection part, and said selector lever being placed at a second position when the image printing mode is commenced, so that a copy sheet is sent by said second transporting means to the paper ejection part.

6. An image recording apparatus according to claim 1, further comprising a cover member provided in the second sheet transporting path in the vicinity of the transfer means, said cover member being placed to a first position between the transfer means and the photosensitive medium when the document reading mode is commenced, a document sheet thus being covered from the photosensitive medium, and said cover member being moved to a second position apart from the transfer means when the image printing mode is commenced.

7. An image recording apparatus according to claim 1, wherein said fixing means includes a pressure switching member for adjusting a pressure of the pressure roller of the fixing means, acting on the fixing roller, to selected one of a normal pressure level and a lowered pressure level in accordance with whether the image printing mode or the document reading mode is commenced.

8. An image recording apparatus according to claim 5, wherein said cover member includes a solenoid unit which actuates in response to a detection signal output by a document sheet detecting sensor when a document sheet placed into the scanner unit is detected.

9. An image recording apparatus according to claim 7, wherein said pressure switching member includes a solenoid unit which actuates in response to a detection signal output by a document sheet detecting sensor when a document sheet placed into the scanner unit is detected.

10. An image recording apparatus according to claim 1, wherein a document ejection part is provided in the image recording apparatus at a portion separate from the paper ejection part, so that a copy sheet fed by the paper feeding cassette is ejected to the paper ejection part while a document sheet placed into the scanner unit is ejected to the document ejection part.

* * * * *